(12) United States Patent
MacDonald et al.

(10) Patent No.: US 7,968,663 B2
(45) Date of Patent: Jun. 28, 2011

(54) ANION EXCHANGE POLYMERS, METHODS FOR MAKING AND MATERIALS PREPARED THEREFROM

(75) Inventors: Russell James MacDonald, Wilmington, MA (US); Jack Peters, Stoneham, MA (US)

(73) Assignee: General Electric Company, Schenectady, NY (US)

( * ) Notice: Subject to any disclaimer, the term of this patent is extended or adjusted under 35 U.S.C. 154(b) by 671 days.

(21) Appl. No.: 11/958,653

(22) Filed: Dec. 18, 2007

(65) Prior Publication Data

US 2009/0156699 A1 Jun. 18, 2009

(51) Int. Cl.
*C08F 120/58* (2006.01)
(52) U.S. Cl. ........................................................ 526/304
(58) Field of Classification Search .................... 26/304; 526/304

See application file for complete search history.

(56) References Cited

U.S. PATENT DOCUMENTS

| | | | |
|---|---|---|---|
| 3,689,468 A * | 9/1972 | Cenci et al. | 526/312 |
| 4,231,855 A | 11/1980 | Hodgdon et al. | |
| 4,452,916 A * | 6/1984 | Boschetti | 521/38 |
| 4,859,756 A * | 8/1989 | Goertz et al. | 526/263 |
| 5,037,858 A | 8/1991 | MacDonald | |
| 5,118,717 A | 6/1992 | Hodgdon et al. | |
| 5,203,982 A | 4/1993 | MacDonald | |
| 5,354,903 A | 10/1994 | MacDonald | |
| 6,410,672 B1 | 6/2002 | MacDonald et al. | |
| 6,531,561 B2 * | 3/2003 | Candau et al. | 526/307.6 |

OTHER PUBLICATIONS

International Search Report issued in connection with corresponding PCT Application No. PCT/US2008/079900 on Feb. 17, 2009.

* cited by examiner

*Primary Examiner* — Bernard Lipman
(74) *Attorney, Agent, or Firm* — GE Global Patent Operation; Catherine J. Winter

(57) ABSTRACT

A novel anion exchange polymer is provided. A method of making the anion exchange polymer includes reacting a tertiary amine, an acid inhibitor and a polyepoxide to form a quaternary ammonium monomer and polymerizing the quaternary ammonium monomer in the presence of a catalyst. The exchange polymer is prepared without using alkyl halides and can be used to make improved ion exchange materials that are chemically resistant and non-fouling.

9 Claims, No Drawings

US 7,968,663 B2

ANION EXCHANGE POLYMERS, METHODS FOR MAKING AND MATERIALS PREPARED THEREFROM

FIELD OF THE INVENTION

This invention relates to ion exchange polymers and more particularly, to anion exchange polymers and materials.

BACKGROUND OF THE INVENTION

Ion exchange materials are commonly employed to treat and remove ionizable components from fluids for a variety of applications. Flow-through beds or flow-through devices for fluid treatment may employ exchange material or components in the form of grains, fabrics or membranes. The ion exchange functionality operates to transport one type of ion across the material in an electric field, while substantially or effectively blocking most ions of the opposite polarity. Anion exchange polymers and materials carry cationic groups, which repel cations and are selective to anions.

Anion exchange polymers may be prepared from tertiary amines, which are quaternized to provide anionic functionality. The quaternary ammonium compounds are crosslinked and polymerized to form anion exchange polymers. Typical methods for making anion exchange polymers require the use of alkyl halides for quaternizing the anion exchange polymer.

Alkyl halides are expensive and hazardous to use. It would be desirable to prepare improved anion exchange polymers having superior properties without using alkyl halides.

SUMMARY OF THE INVENTION

In one embodiment, an anion exchange polymer has the formula:

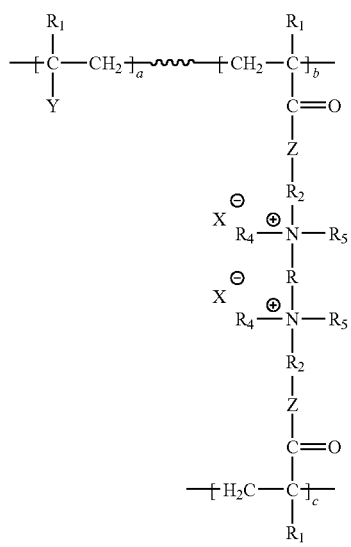

wherein R is —[CH$_2$—CH(OH)]$_2$—W; R$_1$ is hydrogen or a C$_1$-C$_{12}$ alkyl group; a is from about 0 to about 0.75, b and c are each independently, from about 0.25 to about 1.0; Z is oxygen or N—R$_3$; R$_2$ is —[CH$_2$]$_n$—; R$_3$ is hydrogen or —[CH$_2$]$_m$—CH$_3$; R$_4$ and R$_5$ are each, independently, —[CH$_2$]$_m$—CH$_3$; X is selected from the group consisting of Cl, Br, I and acetate; W is a bridging group or atom; m is an integer from 0 to 20; n is an integer from 1 to 20; and Y is selected from the group consisting of

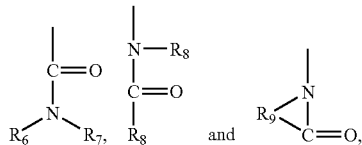

wherein R$_6$, R$_7$ and R$_8$ are each, independently, selected from the group consisting of hydrogen, —[CH$_2$]$_q$—CH$_3$ and —CH(CH$_3$)$_2$; R$_9$ is —[CH$_2$]$_p$; p is a number from 3 to 6 and q is a number from 0 to 3.

In another embodiment, a method for making an anion exchange polymer comprises reacting a tertiary amine, an acid inhibitor and a polyepoxide to form a quaternary ammonium monomer and polymerizing the quaternary ammonium monomer in the presence of a catalyst.

In another embodiment, an ion exchange material comprises an anion exchange polymer having the formula:

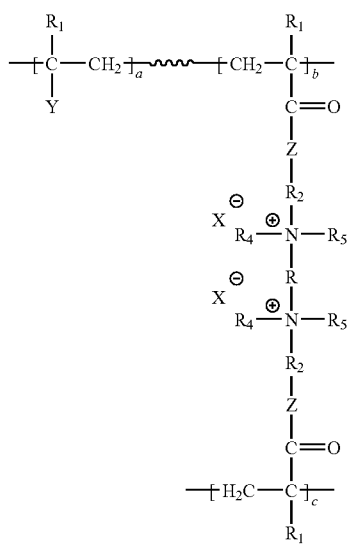

wherein R is —[CH$_2$—CH(OH)]$_2$—W; R$_1$ is hydrogen or a C$_1$-C$_{12}$ alkyl group; a is from about 0 to about 0.75, b and c are each independently, from about 0.25 to about 1.0; Z is oxygen or N—R$_3$; R$_2$ is —[CH$_2$]$_n$—; R$_3$ is hydrogen or —[CH$_2$]$_m$—CH$_3$; R$_4$ and R$_5$ are each, independently, —[CH$_2$]$_m$—CH$_3$; X is selected from the group consisting of Cl, Br, I and acetate; W is a bridging group or atom; m is an integer from 0 to 20; n is an integer from 1 to 20; and Y is selected from the group consisting of

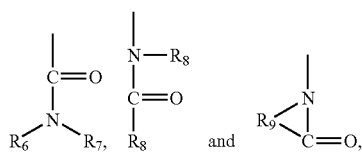

wherein R$_6$, R$_7$ and R$_8$ are each, independently, selected from the group consisting of hydrogen, —[CH$_2$]$_q$—CH$_3$ and —CH(CH$_3$)$_2$; R$_9$ is —[CH$_2$]$_p$; p is a number from 3 to 6 and q is a number from 0 to 3.

In another embodiment, a method for making an ion exchange material comprises reacting a tertiary amine, an acid inhibitor and a polyepoxide to form a quaternary ammonium monomer and polymerizing the quaternary ammonium monomer in the presence of a catalyst.

The various embodiments provide improved anion exchange polymers, methods for preparing the anion exchange polymers without using alkyl halides and for materials that are chemically resistant and non-fouling.

DETAILED DESCRIPTION OF THE INVENTION

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

The anion exchange polymer contains cationic groups. In one embodiment, an anion exchange polymer has the formula:

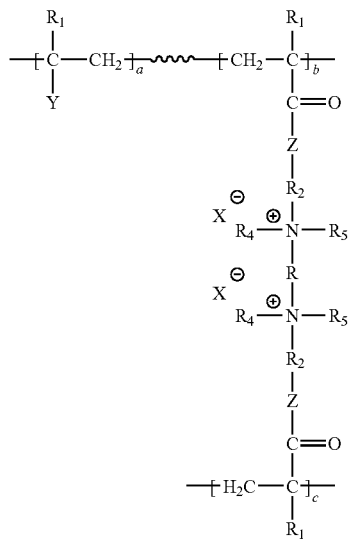

wherein R is —[CH$_2$—CH(OH)]$_2$—W; R$_1$ is hydrogen or a C$_1$-C$_{12}$ alkyl group; a is from about 0 to about 0.75, b and c are each independently, from about 0.25 to about 1.0; Z is oxygen or N—R$_3$; R$_2$ is —[CH$_2$]$_n$—; R$_3$ is hydrogen or —[CH$_2$]$_m$—CH$_3$; R$_4$ and R$_5$ are each, independently, —[CH$_2$]$_m$—CH$_3$; X is selected from the group consisting of Cl, Br, I and acetate; W is a bridging group or atom; m is an integer from 0 to 20; n is an integer from 1 to 20; and Y is selected from the group consisting of

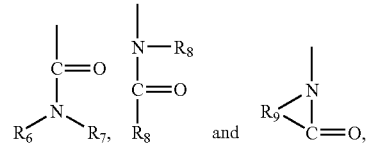

wherein R$_6$, R$_7$ and R$_8$ are each, independently, selected from the group consisting of hydrogen, —[CH$_2$]$_q$—CH$_3$ and —CH(CH$_3$)$_2$; R$_9$ is —[CH$_2$]$_p$; p is a number from 3 to 6 and q is a number from 0 to 3.

In one embodiment, R$_1$ is a C$_1$-C$_6$ alkyl group. In another embodiment, R$_1$ is methyl, ethyl, propyl, butyl or isobutyl.

In one embodiment, a is from about 0.25 to about 0.50. In another embodiment, b is from about 0.50 to about 0.75. In another embodiment, c is from about 0.50 to about 0.75.

In one embodiment, Z is ammonia, trimethylammonia or triethylammonia.

W is a bridging group or atom. In one embodiment, W is a hydrocarbon group, an inorganic group or inorganic atom. In one embodiment, W is a C$_1$-C$_{30}$ alkyl group, C$_1$-C$_{30}$ alkyl ether group, C$_6$-C$_{30}$ aromatic group, C$_6$-C$_{30}$ aromatic ether group or a siloxane. In another embodiment, W is a C$_1$-C$_6$ alkyl group, C$_1$-C$_6$ alkyl ether group, a C$_6$-C$_{10}$ aromatic group or a C$_6$-C$_{10}$ aromatic ether group. In another embodiment, W is methyl, ethyl, propyl, butyl, isobutyl, phenyl, 1,2-cyclohexanedicarboxylate, bisphenol A, diethylene glycol, resorcinol, cyclohexanedimethanol, poly(dimethylsiloxane), 2,6-tolylene diisocyanate, 1,3-butadiene or dicyclopentadiene.

In one embodiment, m is an integer from 0 to 10, including from 0 to 5. In another embodiment, n is an integer from 1 to 10, including from 1 to 5.

In another embodiment, a method for making an anion exchange polymer comprises reacting a tertiary amine, an acid inhibitor and a polyepoxide to form a quaternary ammonium monomer and polymerizing the quaternary ammonium monomer in the presence of a catalyst.

The tertiary amine may be an ethylenic tertiary amine. In one embodiment, the ethylenic tertiary amine is selected from the group consisting of dimethylaminopropylmethacrylamide (DMAPMA), dimethylaminopropylacrylamide (DMAPAA), diethylaminopropylmethacrylamide (DEAPMA), dimethylaminoethylmethacrylate (DMAEMA) and mixtures thereof. In another embodiment, the ethylenic tertiary amine monomer is DMAPMA.

The polyepoxide may be any type of polyepoxide having at least two epoxide groups. In one embodiment, the polyepoxide is a diglycidyl ether or a triglycidyl ether. Diglycidyl ethers include, but are not limited to, diethylene glycol diglycidyl ether, diglycidyl 1,2-cyclohexanedicarboxylate, N,N-diglycidyl-4-glycidyloxyaniline, bisphenol A diglycidyl ether, brominated bisphenol A diglycidyl ether, bisphenol F diglycidyl ether, 1,4-butanediol diglycidyl ether, 1,4-butanediyl diglycidyl ether, 1,4-cyclohexanedimethanol diglycidyl ether, glycerol diglycidyl ether, resorcinol diglycidyl ether, bis[4-(glycidyloxy)phenyl]methane, bisphenol A propoxylate diglycidyl ether, dimer acid diglycidyl ester, ethylene glycol diglycidyl ether, brominated neopentyl glycol diglycidyl ether, diglycidyl ether-terminated poly(dimethylsiloxane), poly(ethylene glycol) diglycidyl ether, poly(propyleneglycol) diglycidyl ether, 1,2,3-propanetriol glycidyl ether and 1,3-butanediol diglycidyl ether. Triglycidyl ethers include, but are not limited to, tris(2,3-epoxypropyl)isocyanurate, trimethylolpropane triglycidyl ether, tris(4-hydroxyphenyl)methane triglycidyl ether 2,6-tolylene diisocyanate, tris(4-hydroxyphenyl)methane triglycidyl ether, glycerol propoxylate triglycidyl ether and trimethylolethane triglycidyl ether.

In another embodiment, the polyepoxide is a diepoxide. Diepoxides include, but are not limited to, 1,3-butadienediepoxide, 1,3-butadiene diepoxide, dicyclopentadiene dioxide, methyl cis,cis-11,12;14,15-diepoxyeicosanoate.

The epoxide quaternizes the tertiary amine to form a quaternary ammonium monomer. The quaternary ammonium monomer is also crosslinked by the epoxide to make the monomer water insoluble. Without crosslinking, the polymers would dissolve in water and would be ineffective for use in ion exchange materials. In one embodiment, the monomer is highly crosslinked. In another embodiment, the polymer is crosslinked in the range of from about 50 to about 100 percent. In another embodiment, the polymer is fully crosslinked.

Polymerization of the quaternary ammonium monomer to form the anion exchange polymer can occur simultaneously with the reaction for quaternizing and crosslinking the tertiary amine. The reaction of the tertiary amine and polyepoxide and the polymerization reaction may be carried out by heating the reactants and monomers to a suitable temperature and for a time sufficient for quaternizing and crosslinking the tertiary amine and for polymerizing the quaternary ammonium monomer. In one embodiment, the temperature range is from about 40° C. to about 150° C. In another embodiment, the temperature range is from about 60° C. to about 110° C. and in another embodiment, the temperature range is from about 85° C. to about 100° C. In one embodiment, the reaction time is from about 1 minute to about 2 hours. In another embodiment, the reaction time is from about 10 minutes to about 1 hour. In another embodiment, the reaction time is from about 20 minutes to about 45 minutes.

The quaternization is conducted in the presence of an acid inhibitor, which controls the polyepoxide from self polymerization. The acid inhibitor prevents the polyepoxide from self polymerizing by quenching the reaction. The amount of quenching is controlled by the amount of acid inhibitor used in the reaction. The acid inhibitor may be any type of acid. In one embodiment, the acid inhibitor is a mineral acid. In another embodiment, the acid inhibitor includes, but is not limited to, hydrochloric acid, methane sulfonic acid, sulfuric acid or phosphoric acid. The acid inhibitor is added in any amount suitable for quenching the polyepoxide. In one embodiment, the acid inhibitor is present in an amount of from about 75 percent by mole weight to about 125 percent by mole weight, based on the mole weight of the tertiary amine. In another embodiment, the acid inhibitor is present in an amount of from about 75 percent by mole weight to about 100 percent by mole weight, based on the mole weight of the tertiary amine.

The anion exchange polymer may be synthesized using a wide ratio range of the tertiary amine to the polyepoxide. In one embodiment, the ratio is from about 0.3 to about 1.5 moles of the tertiary amine to each equivalent mole of the polyepoxide. In another embodiment, the ratio is from about 0.5 to about 1.0 moles of the tertiary amine monomer per equivalent mole of the polyepoxide.

A catalyst is added to aid in polymerization. The catalysts may be spontaneously activated or activated by heat, electromagnetic radiation, electron beam radiation or by chemical promoters. The catalyst may be added in any amount suitable for aiding in polymerization. In one embodiment, the catalyst is in an amount of from about 0.1 to about 5.0 percent by weight of the reaction mixture.

The catalyst may be any type of catalyst suitable for polymerizing the quaternary ammonium monomer. In one embodiment, the catalyst is a peroxide. The peroxide includes, but is not limited to, methyl ethyl ketone peroxide and dibenzoyl peroxide. In another embodiment, the catalyst is a water soluble or oil soluble azo initiator. The azo initiator includes, but is not limited to, 2,2'-azobis[2-(2-imidazolin-2-yl)propane]dihydrochloride, 2,2'-azobis(N,N'-dimethylene isobutyramidine)dihydrochloride, 2,2'-azobis(2-methylpropionamidine)dihydrochloride, 2,2'-azobis[N-(2-carboxyethyl)-2-methylpropionamidine]hydrate, 2,2'-azobis {2-[1-(2-hydroxyethyl)-2-imidazolin-2-yl)propane], 2,2'-azobis[2-methyl-N-(2-hydroxyethyl)propionamide] and dimethyl 2,2'-azobis(2-methylpropionate).

The term "chemical promoters" as used herein refers to a substance, which increases the rate of polymerization either by itself or in combination with another catalyst. For example, methyl ethyl ketone peroxide can function as a catalyst itself, but its rate of initiation can be greatly increase by small amounts of transition metal salt chemical promoters, such as, for example, cobalt naphthenate. Similarly, dibenzoyl peroxide can function as a catalyst itself, but its action be accelerated by a dimethylaniline chemical promoter. The UV radiation polymerization agents can become more efficient in the presence of chemical promoters, which are photoinitiators or chemical compounds that generate free radicals. Non-limiting examples of photoinitiating chemical promoters include benzophenone, benzyl, antraquinone, eosin and methylene blue.

In one embodiment, the components are combined in the presence of a solvent. Any solvent is suitable for use in this embodiment, so long as the solvent is not itself polymerizable and the components are soluble in it. Solvents suitable in this embodiment include, but are not limited to, water, polyethylene glycols, dimethylsulfoxide, 2-pyrrolidone, N-methyl pyrrolidone and mixtures thereof.

The amount of solvent is added in any amount suitable for solubilizing the components. In one embodiment, the amount of solvent is from about 10 to about 90 percent by weight based on the total weight of the reaction mixture. In another embodiment, the amount of solvent is from about 20 to about 70 percent by weight based on the total weight of the reaction mixture. In another embodiment, the amount of solvent is from about 25 to about 50 percent by weight based on the total weight of the reaction mixture.

The components are combined and reacted in any conventional manner. The order of addition is not critical and the components may be added in any order.

An example of a reaction forming a quaternary ammonium monomer by reacting DMAPMA with a polyepoxide and hydrochloric acid (HCl) is shown below:

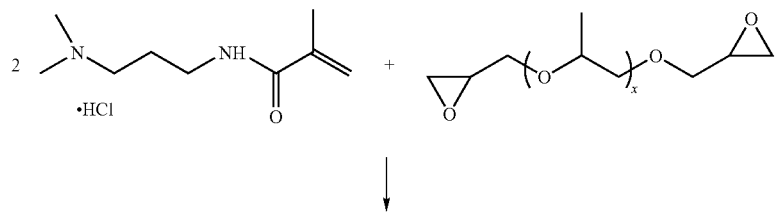

-continued

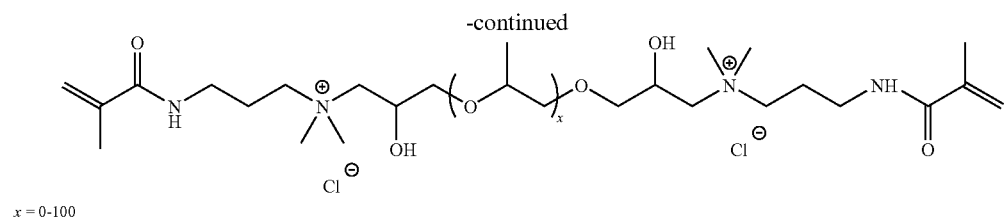

$x = 0-100$

Additionally, other ethylenic monomers may be added to the polymerization mixture to increase or decrease the ion exchange capacity of the resulting ion exchange polymer. Examples of ethylenic monomers that lower the ion exchange capacity include, but are not limited to, methacrylamine, N-methylmethacrylamide, N-vinyl pyrrolidinone and N-vinyl caprolactam. Examples of ethylenic monomers that raise the ion exchange capacity include, but are not limited to, methacrylamidopropyl trimethylammonium chloride (MAP-TAC) and trimethylammoniumethyl methacrylate chloride (TMAEMC).

These ethylenic monomers may be added to the reaction mixture with the other reactants and may be added in any order with the reactants. The ethylenic monomers may be added in any amount suitable for affecting the ion exchange capacity of the ion exchange polymer. In one embodiment, the ethylenic monomer is added in an amount of from about 0 to about 50 molar percent of the tertiary amine. In another embodiment, the ethylenic monomer may be added in an amount of from about 10 to about 40 molar percent of the tertiary amine. In another embodiment, the ethylenic monomer may be added in an amount of from about 20 to about 40 molar percent of the tertiary amine.

The anion exchange polymer may be used to form ion exchange materials. In one embodiment, an ion exchange material comprises an anion exchange polymer having the formula:

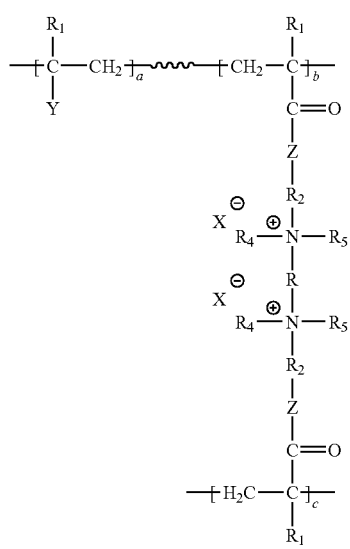

wherein R is $-[CH_2-CH(OH)]_2-W$; $R_1$ is hydrogen or a $C_1$-$C_{12}$ alkyl group; a is from about 0 to about 0.75, b is and c are each independently, from about 0.25 to about 1.0; Z is oxygen or $N-R_3$; $R_2$ is $-[CH_2]_n-$; $R_3$ is hydrogen or $-[CH_2]_m-CH_3$; $R_4$ and $R_5$ are each, independently, $-[CH_2]_m-CH_3$; X is selected from the group consisting of Cl, Br, I and acetate; W is a bridging group or atom; m is an integer from 0 to 20; n is an integer from 1 to 20; and Y is selected from the group consisting of

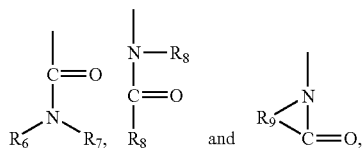

wherein $R_6$, $R_7$ and $R_8$ are each, independently, selected from the group consisting of hydrogen, $-[CH_2]_q-CH_3$ and $-CH(CH_3)_2$; $R_9$ is $-[CH_2]_p$; p is a number from 3 to 6 and q is a number from 0 to 3.

In one embodiment, $R_1$ is a $C_1$-$C_6$ alkyl group. In another embodiment, $R_1$ is methyl, ethyl, propyl, butyl or isobutyl.

In one embodiment, a is from about 0.25 to about 0.50. In another embodiment, b is from about 0.50 to about 0.75. In another embodiment, c is from about 0.50 to about 0.75.

In one embodiment, Z is ammonia, trimethylammonia or triethylammonia.

W is a bridging group or atom. In one embodiment, W is a hydrocarbon group, an inorganic group or inorganic atom. In one embodiment, W is a $C_1$-$C_{30}$ alkyl group, $C_1$-$C_{30}$ alkyl ether group, $C_6$-$C_{30}$ aromatic group, $C_6$-$C_{30}$ aromatic ether group or a siloxane. In another embodiment, W is a $C_1$-$C_6$ alkyl group, $C_1$-$C_6$ alkyl ether group, a $C_6$-$C_{10}$ aromatic group or a $C_6$-$C_{10}$ aromatic ether group. In another embodiment, W is methyl, ethyl, propyl, butyl, isobutyl, phenyl, 1,2-cyclohexanedicarboxylate, bisphenol A, diethylene glycol, resorcinol, cyclohexanedimethanol, poly(dimethylsiloxane), 2,6-tolylene diisocyanate, 1,3-butadiene or dicyclopentadiene.

In one embodiment, m is an integer from 0 to 10, including from 0 to 5. In another embodiment, n is an integer from 1 to 10, including from 1 to 5.

In one embodiment, the ion exchange material may be anion exchange resin beads or an anion exchange membrane.

In another embodiment, a method for making an ion exchange material comprises reacting a tertiary amine, an acid inhibitor and a polyepoxide to form a quaternary ammonium monomer and polymerizing the quaternary ammonium monomer in the presence of a catalyst.

An anion exchange membrane may be formed by any method known in the art. In one embodiment, the membrane is formed by reinforcing a fabric with the anion exchange polymer. A liquid mixture of the reactants can be applied to the fabric by casting the liquid monomer mixture onto the fabric or by soaking the fabric in the liquid mixture using individual pieces of fabric, multiple pieces of fabric arranged in stacks or with fabric from a roll in a continuous process. When heat is applied, the reaction between the reactants and polymerization will occur to form a crosslinked anion exchange membrane supported by a fabric.

In another embodiment, the membrane is formed by imbibing a porous plastic film, such as polyethylene, polypropylene or Teflon®, with the anion exchange polymer. A liquid mixture of the reactants can be applied to the porous plastic film by casting the liquid monomer mixture onto the porous plastic film or by soaking the porous plastic film in the liquid mixture. When heat is applied, the reaction between the reactants and polymerization will occur to form a crosslinked anion exchange membrane supported by a porous plastic film.

The anion exchange monomers can also be polymerized into a solid mass, processed and pulverized into small particles. The small particles can then be blended in an extruder and heated with a melted plastic, such as polyethylene or polypropylene. The plastic and ion exchange mixture can then be extruded into thin sheets of ion exchange membranes.

Exchange resin beads may be produced by suspending the mixture of the reactants in a water immiscible organic media and heating to form ion exchange beads. When heat is applied, the reaction between the reactants and polymerization will occur. Beads may also be produced by a vibratory spray mechanism.

In order that those skilled in the art will be better able to practice the present disclosure, the following examples are given by way of illustration and not by way of limitation.

EXAMPLES

Example 1

DMAPMA (30.6 g, 0.18 mole), hydrochloric acid (15.4 g, 0.16 mole), 1,2,3-propanetriol glycidyl ether (GE100) (23.6 g, 0.09 mole) and 28.0 g of water were mixed and stirred for one hour. 1.4 g of a catalyst, 2,2'-azobis(N,N'-dimethylene isobutyramidine) dihydrochloride supplied by Wako Chemicals USA, Dallas, Tex. (VA044), was added and the mixture was spread onto acrylic cloth between two Mylar sheets and sandwiched between glass plates. The resulting assembly was heated to 85° C. for 30 minutes. The sandwich was separated and the resulting anion exchange membrane was placed into water.

The following membrane properties were obtained:
Cap (meq/g)=2.67
Water content (%)=43.8
Resistivity (ohm-cm$^2$)=11.1
Thickness (cm)=0.063

The anion exchange capacity was expressed as milligram-equivalents per gram of dry anion exchange resin in the nitrate form (i.e., not including fabric). The water content was expressed as percent by weight of the wet anion exchange resin in the nitrate form (i.e., not including fabric). The areal resistance of a square centimeter of membrane in the chloride form was measured in 0.01N NaCl at 1000 Hz.

Example 2

DMAPMA (30.6 g, 0.18 mole), hydrochloric acid (15.4 g, 0.16 mole), 1,2,3-propanetriol glycidyl ether (GE100) (23.6 g, 0.09 mole), N-Vinyl caprolactam (9.4 g, 0.068 mole) and 28.0 g of water were mixed and stirred for one hour. 1.4 g of a catalyst, 2,2'-azobis(N,N'-dimethylene isobutyramidine) dihydrochloride supplied by Wako Chemicals USA, Dallas, Tex. (VA044), was added and the mixture was spread onto acrylic cloth between two Mylar sheets and sandwiched between glass plates. The resulting assembly was heated to 85° C. for 30 minutes. The sandwich was separated and the resulting anion exchange membrane was placed into water.

The following membrane properties were obtained:
Cap (meq/g)=2.35
Water content (%)=42.9
Resistivity (ohm-cm$^2$)=15.4
Thickness (cm)=0.067

The anion exchange capacity was expressed as milligram-equivalents per gram of dry anion exchange resin in the nitrate form (i.e., not including fabric). The water content was expressed as percent by weight of the wet anion exchange resin in the nitrate form (i.e., not including fabric). The areal resistance of a square centimeter of membrane in the chloride form was measured in 0.01N NaCl at 1000 Hz.

While typical embodiments have been set forth for the purpose of illustration, the foregoing descriptions should not be deemed to be a limitation on the scope herein. Accordingly, various modifications, adaptations and alternatives may occur to one skilled in the art without departing from the spirit and scope herein.

The invention claimed is:

1. A method for making an anion exchange polymer comprising reacting a tertiary amine, an acid inhibitor and a polyepoxide to form a quaternary ammonium monomer and polymerizing the quaternary ammonium monomer in the presence of a catalyst,
wherein the tertiary amine is an ethylenic tertiary amine, and
wherein the polyepoxide is a diglycidyl ether or a triglycidyl ether.

2. The method acclaim 1 wherein the tertiary amine is selected from the group consisting of dimethylaminopropylmethacrylamide, dimethylaminopropylacrylamide, diethylaminopropylmethacrylamide, dimethylaminoethylmethacrylate and mixtures thereof.

3. The method of claim 2 wherein the tertiary amine monomer is dimethylaminopropylmethacrylamide.

4. The method of claim 1 wherein the polyepoxide is selected from the group consisting of diethylene glycol diglycidyl ether, diglycidyl 1,2-cyclohexanedicarboxylate, N,N-diglycidyl-4-glycidyloxyaniline, biisphenol A diglycidyl ether, brominated bisphenol A diglycidyl ether, bisphenol F diglycidyl ether, 1,4-butanediol diglycidyl ether, 1,4-butanediyl diglycidyl ether, 1,4-cyclohexanedimethanol diglycidyl ether, glycerol diglycidyl ether, resorcinol diglycidyl ether, bis[4-(glycidyloxy)phenyl]methane, bisphenol A propoxylate diglycidyl ether, dimer acid diglycidyl ester, ethylene diglycidyl ether, brominated neopentyl glycol diglycidyl ether, diglycidyl ether-terminated poly(dimethylsiloxane), poly(ethylene glycol) diglycidyl ether, poly(propyleneglycol)diglycidyl ether, 1,2,3-propanetriol glycidyl ether, 1,3-butanediol diglycidyl ether, tris(2,3-epoxypropyl)isocyanurate, trimethylolpropane triglycidyl ether, tris(4-hydroxyphenyl)methane triglycidyl ether 2,6-tolylene diisocyanate, tris(4-hydroxyphenyl)methane triglycidyl ether, glycerol propoxylate triglycidyl ether and trimethylolethane triglycidyl ether.

5. The method of claim 1 wherein the reaction is heated from about 40° C. to about 150° C. from about 1 minute to about 2 hours.

6. The method of claim 1 wherein the acid inhibitor is hydrochloric acid, methane sulfonic acid, sulfuric acid or phosphoric acid.

7. The method of claim 1 wherein the ratio of the moles of tertiary amine per equivalent mole of the polyepoxide is from about 0.3 to about 1.5.

8. The method of claim 1 further comprising adding an ethylenic monomer.

9. The method of claim 8 wherein the ethylenic monomer is selected from the group consisting of methacrylamine, N-methylmethacrylamide, N-vinyl pyrrolidinone, N-vinyl caprolactam, methacrylamidopropyl trimethylammonium chloride and trimethylammoniumethyl methacrylate chloride.

* * * * *